Figure 1:
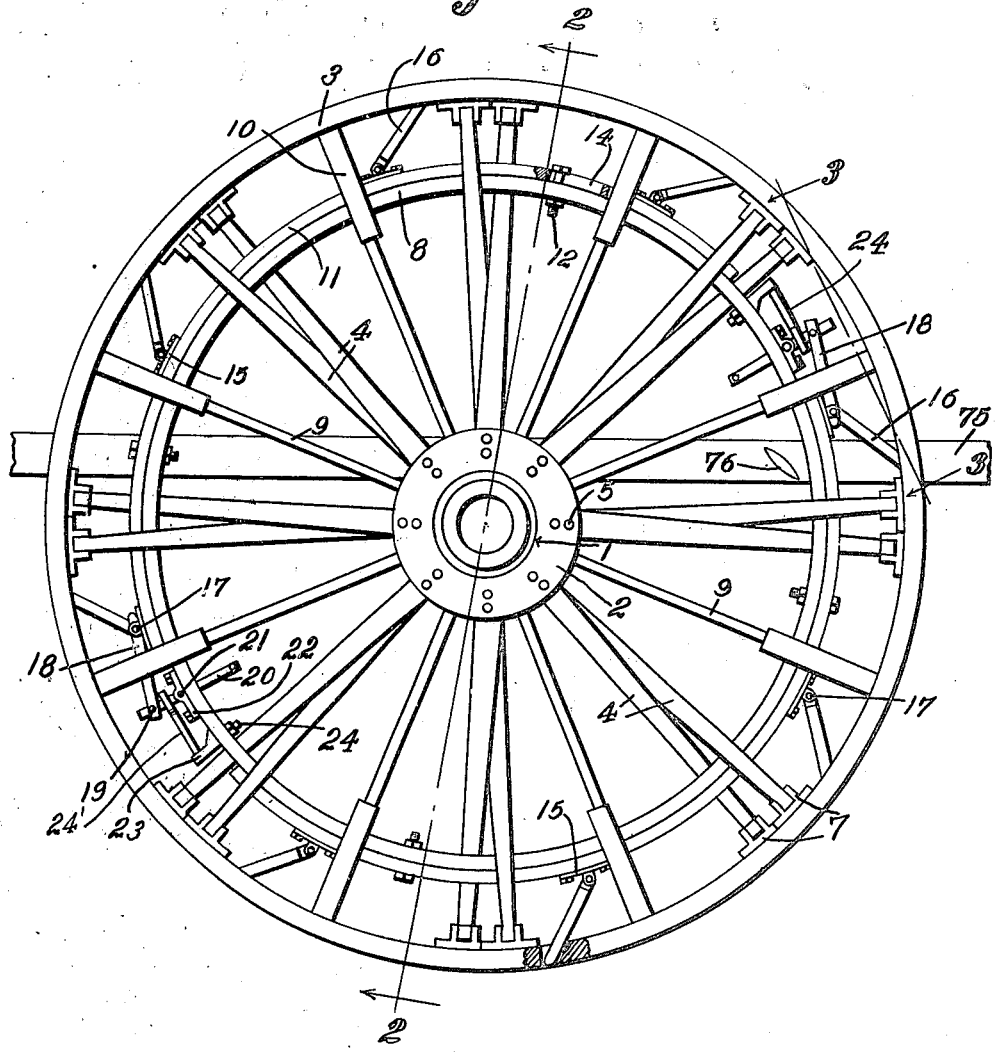

H. J. BOLINSKI.
DRIVE WHEEL FOR TRACTORS.
APPLICATION FILED JULY 30, 1921.

Patented Oct. 10, 1922.

Inventor
H. J. Bolinski.
By C. A. Snow & Co.
Attorney

H. J. BOLINSKI.
DRIVE WHEEL FOR TRACTORS.
APPLICATION FILED JULY 30, 1921.
1,431,362.
Patented Oct. 10, 1922.
2 SHEETS—SHEET 2.
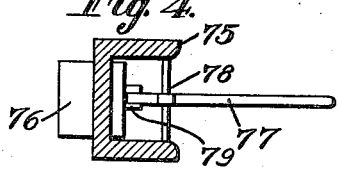
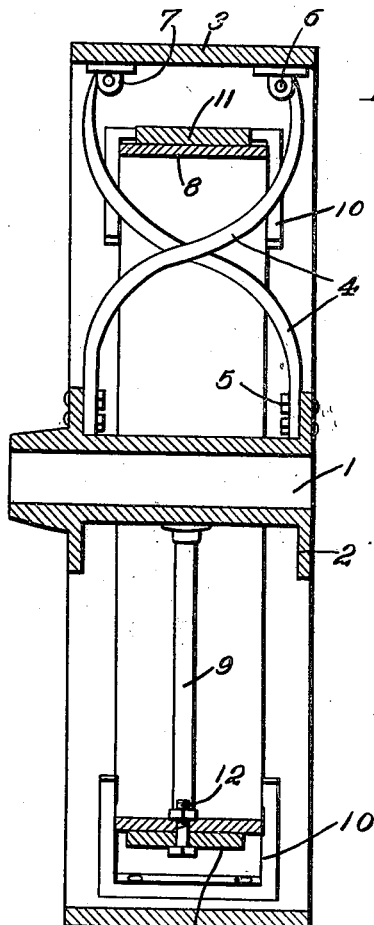
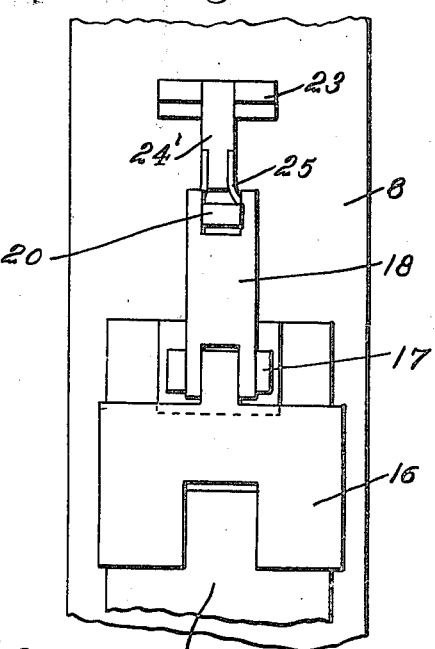
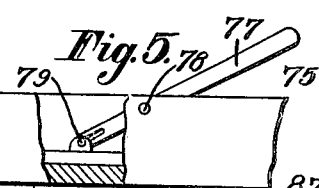
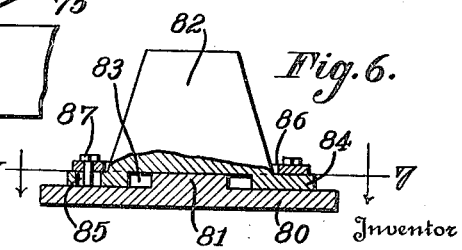
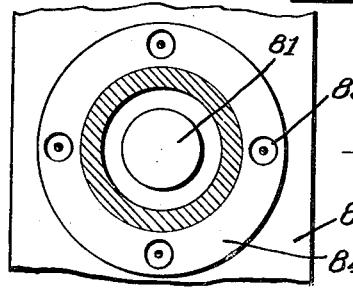
Inventor
H.J.Bolinski.
By C.A.Snow & Co.
Attorney Patented Oct. 10, 1922.

1,431,362

UNITED STATES PATENT OFFICE.

HERMAN JAY BOLINSKI, OF DETROIT, MICHIGAN.

DRIVE WHEEL FOR TRACTORS.

Application filed July 30, 1921. Serial No. 488,537.

*To all whom it may concern:*

Be it known that I, HERMAN JAY BOLINSKI, a citizen of the United States, residing at Detroit, in the county of Wayne and State of Michigan, have invented a new and useful Drive Wheel for Tractors, of which the following is a specification.

This invention aims to provide novel means whereby, at the will of an operator, traction spurs may be advanced with respect to the rim of a wheel, to enhance the hold of the wheel on the ground.

It is within the province of the disclosure to improve generally and to enhance the utility of devices of that sort to which the invention appertains.

I have shown but one form of my invention, as an illustration of the general idea embodied therein, but it is to be understood that the invention may be embodied in other forms, and that, within the scope of what is claimed, a mechanic may make changes in the form shown, without departing from the spirit of the invention.

In the drawings:— Figure 1 shows in elevation, a device constructed in accordance with the invention; Figure 2 is a section on the line 2—2 of Figure 1; and Figure 3 is a section on the line 3—3 of Figure 1. Figure 4 is a fragmental transverse section taken through a portion of the frame of the vehicle; Figure 5 is a top plan of the structure shown in Figure 4; Figure 6 is a sectional detail showing a slight modification in the invention; and Figure 7 is a section on the line 7—7 of Figure 6.

In carrying out the invention, there is provided a hub 1 having flanges 2. The numeral 3 marks a main or outer rim. Any suitable means may be provided for connecting the main rim 3 to the hub 1. If desired, reversely curved spring spokes 4 may be used, the inner ends of the spokes being connected at 5 to the flanges 2, the outer ends of the spokes being pivotally connected at 6 to brackets 7, mounted on the main rim 3. The spokes 4 extend transversely of the wheel, and each spoke has its inner end connected to the hub 1 at one side of the wheel, the outer end of the spoke being connected to the main rim 3 at the opposite side of the wheel.

An auxiliary or inner rim 8 is located within the main rim 3 and is spaced therefrom. Spokes 9 connect the auxiliary rim 8 with the hub 1, the spokes 9 preferably being rigid. U-shaped guides 10 are secured to the outer rim 3 and project inwardly therefrom, the auxiliary rim 8 being received within the guides. The function of the guides is to prevent the main rim 3 from having lateral movement, when the main rim moves inwardly and outwardly, as the spring spokes 4 yield.

Curved shoes 11 are mounted for limited sliding movement on the inner rim 8, circumferentially thereof. Securing elements 12, such as bolts are mounted in the inner rim 8 and are received in elongated slots 14 formed in the shoes 11, the construction being such that, although the shoes are secured to the inner rim, the shoes, nevertheless, may move circumferentially of the rim, as aforesaid.

Attaching plates 15 are connected to the outer surface of each shoe 11. Spurs 16 are provided, and are, or may be, of approximately U-shaped, as shown in Figure 3, the spurs being slidable in the main rim 3. The spurs are attached by pivot elements 17 to the plates 15. Links 18 are mounted on certain of the pivot elements 17 and are pivoted at 19 to leavers 20, fulcrumed at 21 on brackets 22 secured to the inner rim 8, the inner ends of the levers projecting toward the hub 1. Standards 23 are secured at 24 to the inner rim 8, and carry circumferentially extended stops 24, terminating in spring forks 25.

When the levers 20 are in the position shown in Figure 1, the levers abut against the stops 24 and are held by the forks 25 against swinging movement on the pivot elements 21. When, however, the levers 20 are swung on their fulcra 21, the shoes 11 will be caused to move circumferentially of the rim 8, the spurs 16 being carried outwardly into ground-engaging position, motion being transmitted from the levers to the shoes, by way of the links 18.

The device embodies a mechanism under the control of an operator, and mounted on the frame of the vehicle, whereby the levers 20 may be swung, as and for the purpose hereinbefore alluded to. The mechanism under the control of the driver of the vehicle will now be described.

The numeral 75 denotes a portion of the frame work of the vehicle. An operating member 76 is mounted to slide in the frame 75. A lever 77 is fulcrumed at 78 on the frame 75 and is pivotally connected at 79 with the operating member 76. Any suitable means may be provided for actuating the lever 77 from a remote point on the vehicle. When the lever 77 is tilted on its fulcrum 78, the operating member 76 will be advanced into the path of the levers 20, thereby to move the spurs 16 outwardly.

Referring to Figures 6 and 7, the rim of the wheel is shown at 80 and may be provided with any desired number of outwardly extended bosses 81. The spurs 82 are provided in their bases with recesses 83, receiving the bosses 81. The spur 82 has an outstanding flange 84 mounted to slide on the rim 80, the flange 84 having openings 85. A ring 86 surrounds the spur 82 and rests on the flange 84. Securing elements 87 connect the ring 86 with the rim 80 and are received in the openings 85 of the flange 84 of the spur 82. It will be clear that the spur 82 has a slight sliding movement on the rim 80 and, owing to this sliding movement, the spur will clear itself of mud and the like. The boss 81 takes some of the strain off the securing elements 87.

I claim:—

1. A wheel embodying a hub; an outer rim; an inner rim; means for connecting the rims to the hub; a shoe slidable on the inner rim circumferentially thereof; a spur pivoted to the shoe and slidable in the outer rim; and means for imparting sliding movement to the shoe.

2. A device of the class described, constructed as set forth in claim 1, and further characterized by the fact that the means for imparting sliding movement to the shoe comprises a lever fulcrumed on the inner rim; and a link connecting the lever with the shoe.

3. A device of the class described, constructed as set forth in claim 1, and further characterized by the fact that the means for imparting sliding movement to the shoe comprises a lever fulcrumed on the inner rim, and a link connecting the lever with the shoe; and a stop mounted on the inner rim; the lever engaging the stop when the shoe and the spur are retracted.

4. A wheel embodying a hub; an outer rim; an inner rim disposed between the outer rim and the hub; resilient spokes connecting the outer rim with the hub; rigid spokes connecting the inner rim with the hub; and guides mounted on the outer rim and engaged slidably with the inner rim to prevent lateral movement of the outer rim with respect to the inner rim.

5. A wheel embodying a hub; an outer rim; an inner rim disposed between the outer rim and the hub; means for connecting the outer rim yieldingly to the hub; means for connecting the inner rim rigidly to the hub; and guiding mechanism cooperating with the rims, to prevent lateral movement of the outer rim.

6. In a device of the class described, a wheel embodying a hub; an outer rim; an inner rim; means for connecting the rims to the hub; a shoe slidable on the inner rim circumferentially thereof; a spur pivoted to the shoe and slidable in the outer rim; means, embodying a lever fulcrumed on the inner rim, for imparting sliding movement to the shoe; a frame; an operating member slidable on the frame, into and out of the path of the lever; and means for actuating the operating member.

In testimony that I claim the foregoing as my own, I have hereto affixed my signature in the presence of two witnesses.

HERMAN JAY BOLINSKI.

Witnesses:
 Roy Horace Burton,
 Jake Smith.